United States Patent
Tao

(10) Patent No.: US 9,373,156 B2
(45) Date of Patent: Jun. 21, 2016

(54) METHOD FOR CONTROLLING ROTATION OF SCREEN PICTURE OF TERMINAL, AND TERMINAL

(71) Applicant: DONGGUAN GOLDEX COMMUNICATION TECHNOLOGY CO., LTD., Dongguan (CN)

(72) Inventor: Chao Tao, Dongguan (CN)

(73) Assignee: DONGGUAN GOLDEX COMMUNICATION TECHNOLOGY CO., LTD., Dongguan, Guangdong (CN)

( * ) Notice: Subject to any disclaimer, the term of this patent is extended or adjusted under 35 U.S.C. 154(b) by 0 days.

(21) Appl. No.: 14/381,093

(22) PCT Filed: Oct. 23, 2013

(86) PCT No.: PCT/CN2013/085799
§ 371 (c)(1),
(2) Date: Aug. 26, 2014

(87) PCT Pub. No.: WO2014/107982
PCT Pub. Date: Jul. 17, 2014

(65) Prior Publication Data
US 2015/0042556 A1    Feb. 12, 2015

(30) Foreign Application Priority Data
Jan. 11, 2013  (CN) .......................... 2013 1 0010222

(51) Int. Cl.
G06F 3/045    (2006.01)
G06T 3/60    (2006.01)
G06F 3/01    (2006.01)
G09G 5/00    (2006.01)

(52) U.S. Cl.
CPC . *G06T 3/60* (2013.01); *G06F 3/012* (2013.01); *G06F 2200/1637* (2013.01); *G06T 2207/30201* (2013.01); *G09G 5/00* (2013.01); *G09G 2340/0492* (2013.01); *G09G 2354/00* (2013.01)

(58) Field of Classification Search
CPC . G06T 3/60; G06T 2207/30201; G06F 3/012; G06F 2200/1637; G09G 2340/0492; G09G 2354/00; G09G 5/00
USPC .......................................................... 345/156
See application file for complete search history.

(56) References Cited

U.S. PATENT DOCUMENTS

2009/0180004 A1*  7/2009  Shioda ............... H04N 5/23219
348/231.2

* cited by examiner

*Primary Examiner* — Gustavo Polo
(74) *Attorney, Agent, or Firm* — Shimokaji IP

(57) ABSTRACT

Embodiments of the present invention disclose a method for controlling display interface rotation of a terminal, including: collecting human face image data of a user; processing the human face image data of the user to acquire human face posture information; and rotating a display interface according to the human face posture information to adjust a direction of the display interface of the terminal. The embodiments of the present invention further disclose a terminal. According to the present invention, a display interface of the terminal may remain in an orthophoric direction of a user, which can improve the visual experience of the user and make the terminal more intelligent.

8 Claims, 6 Drawing Sheets

METHOD FOR CONTROLLING ROTATION OF SCREEN PICTURE OF TERMINAL, AND TERMINAL

This application claims priority to Chinese Patent Application No. 201310010222.7, filed with the Chinese Patent Office on Jan. 11, 2013, and entitled "METHOD FOR CONTROLLING ROTATION OF SCREEN PICTURE OF TERMINAL, AND TERMINAL", which is incorporated herein by reference in its entirety for all purposes.

TECHNICAL FIELD

The present invention relates to the field of electronics technologies, and in particular, to a method for controlling display interface rotation of a terminal and a terminal.

BACKGROUND

With the development of electronics technologies and improvement of terminal performance, users have an increasingly high requirement for information acquisition. As a visual carrier, a screen is a main means for acquiring information. What many manufacturers are striving for is how to make a user get better experience in the process of using terminal device. A direct and efficient method is to use gorgeous display interfaces for displaying information to improve experience of a user.

In a display interface rotating display technology, a picture is rotated to make a display interface better adapted to a visual field for a user operation, thereby improving the experience of a user. However, in an existing display interface rotating technology, a built-in gravity sensor of a terminal is used to sense a direction of a gravitational acceleration of the terminal, to determine a screen direction and then perform rotation for a display interface. For example, when a user is in a standing state and vertically holds a mobile phone with a hand, the gravity sensor determines that the direction of the display interface is portrait, that is, the mobile phone is in portrait mode; when the user is in the standing state and horizontally holds the mobile phone with a hand, the gravity sensor determines that the direction of the display interface is landscape, that is, the mobile phone is in landscape mode. However, a case that a face posture of the user actually changes is not taken into consideration. For example, when a user is in a side-lying state, if the user still vertically holds the mobile phone with a hand, the gravity sensor determines that the direction of the display interface is still portrait. However, in this case, the direction of the display interface should be landscape according to an orthophoric angle of eyes of the user. Therefore, a determining error against an actual situation (such as landscape) occurs when the gravity sensor is used to determine the direction (such as portrait) of the display interface, and the display interface cannot be switched according to the change of the human face posture. As a result, the user cannot use the terminal smoothly, and a visual effect is poor, thus reducing the experience of a user. Moreover, when the user's face moves to a certain direction, a fuzzy image and a picture that even cannot be viewed may occur, which causes a lot of trouble in using the terminal to the user.

SUMMARY

Embodiments of the present invention provide a method for controlling display interface rotation of a terminal and a terminal, which can improve visual experience of a user and make the terminal more intelligent.

An embodiment of the present invention provides a method for controlling display interface rotation of a terminal, including:
 collecting human face image data of a user;
 processing the human face image data of the user to acquire human face posture information; and
 rotating a display interface according to the human face posture information to adjust a direction of the display interface of a terminal.

Accordingly, an embodiment of the present invention further provides a terminal, including:
 a first collecting unit, configured to collect human face image data of a user;
 a first processing unit, configured to process the human face image data of the user to acquire human face posture information; and
 a rotating unit, configured to rotate a display interface according to the human face posture information to adjust a direction of the display interface of the terminal.

In the embodiments of the present invention, a method for collecting human face image data of a user, acquiring human posture information, and rotating a display interface according to the human face posture information to adjust the direction of the display interface of a terminal can keep the display interface of the terminal in an orthophoric direction of a user, which improves visual experience of the user and makes the terminal more intelligent.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

A terminal in the embodiments of the present invention may be a mobile terminal that supports display interface displaying, such as a mobile phone, a tablet computer, or a music player.

Figure 1:
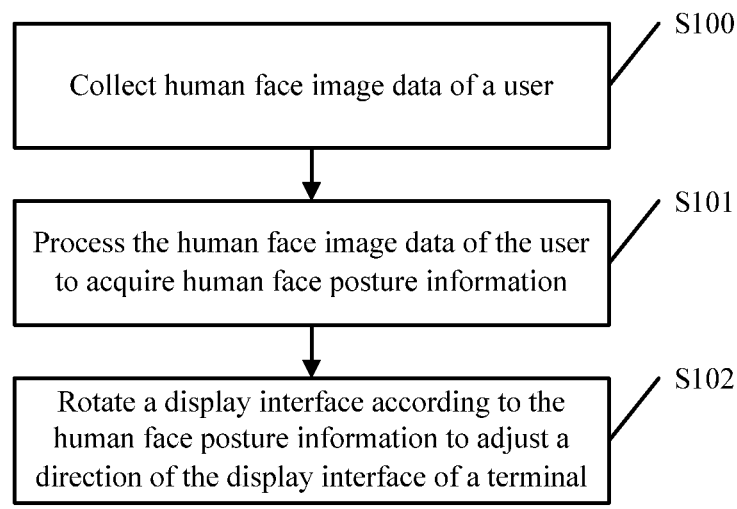
FIG. 1 is a schematic flowchart of a method for controlling display interface rotation of a terminal according to a first embodiment of the present invention.

Referring to FIG. 1, FIG. 1 is a flowchart of a method for controlling display interface rotation of a terminal according to a first embodiment of the present invention. As described in FIG. 1, the method for controlling display interface rotation of a terminal described in this embodiment includes the following steps.

S100: collecting human face image data of a user.

In a specific embodiment, to collect the human face image data of the user, the human face image data of the user may be obtained by means of a front camera of a terminal. The human face image data may include, but not limited to: human face features of the user, such as five sense organs, a skin color, and hair.

S101: processing the human face image data of the user to acquire human face posture information.

In a specific embodiment, a pattern recognition technology is used to analyze the human face image data of the user to acquire the human face posture information of the user. The pattern recognition is a technology that is used to classify and describe images or varieties of physical objects. The pattern recognition technology is widely applied to machine vision, involving not only recognitions of a graph, an image, and a character, but also measurement, classification, and description of a tangible object.

Further, the human face posture information includes an angle variation that a human face posture direction deviates from a reference direction reset by the terminal in a clockwise direction. The human face posture direction is a "+" vector of a current human face. The following provides detailed description with reference to FIG. 2.

Figure 2:
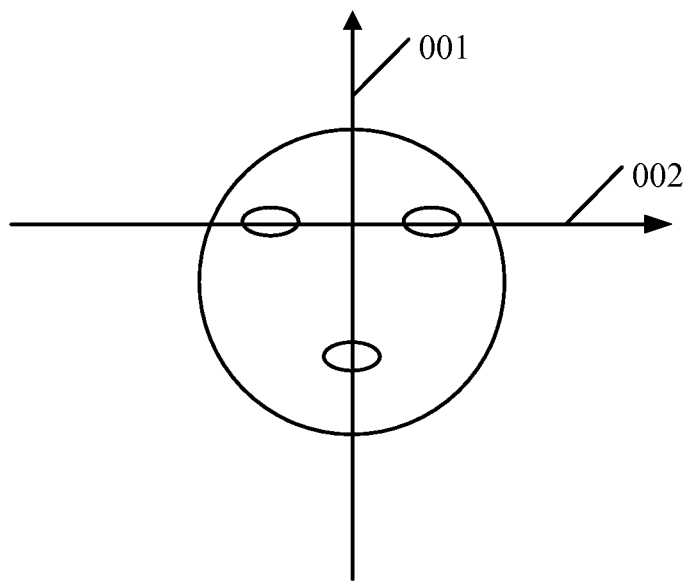
FIG. 2 is a schematic diagram of a "+" vector of a human face according to an embodiment of the present invention.

As shown in FIG. 2, a direction indicated by a straight line between two eyes is defined as a horizontal direction 002 of the "+" vector of the human face posture direction, and a direction from the left eye to the right eye is defined as a positive direction of a horizontal axis according to the human face image data. A direction indicated by a straight line between a nose and a mouth is defined as a vertical direction 001 of the "+" vector of the human face posture direction, and a direction from the mouth to the nose is defined as a positive direction of a vertical axis according to the human face image data.

Further, the reference direction is a direction specified by the terminal in a stipulated plane coordinate system. The following provides detailed descriptions with reference to FIG. 3.

Figure 3:
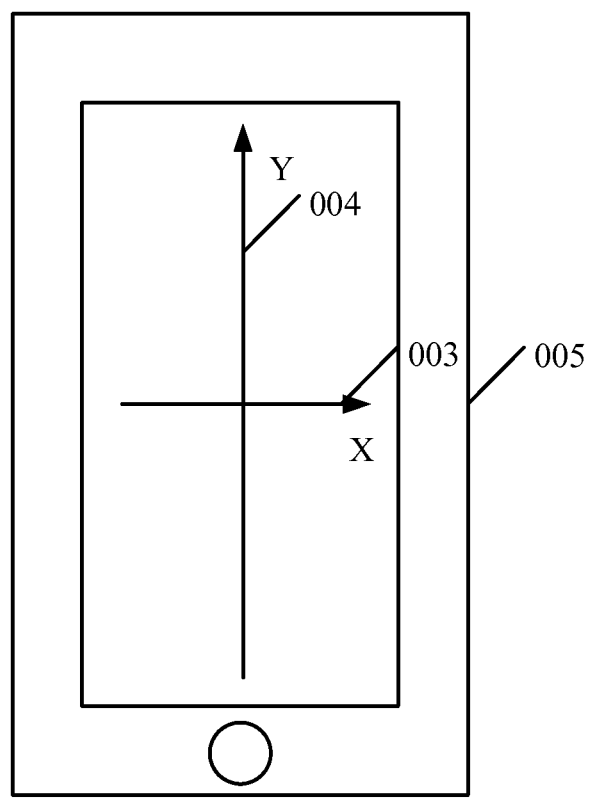
FIG. 3 is a schematic diagram of a plane coordinate system stipulated by a terminal according to an embodiment of the present invention.

As shown in FIG. 3, the plane coordinate system stipulated by the terminal can be a plane coordinate system formed by such as a horizontal axis X 003 and a vertical axis Y 004 as shown in FIG. 3. The horizontal axis X 003 is a horizontal reference direction which is specified by the terminal, and the vertical axis Y 004 is a vertical reference direction specified by the terminal. The reference direction remains unchanged relative to a direction of a display screen of the terminal, that is, the reference direction relative to the direction of the display screen of the terminal is shown by 005. When the terminal is in a portrait mode, the horizontal axis X 003 is a straight line that passes through a midpoint of the terminal and is parallel to the horizontal plane, and a direction indicated by the straight line is a direction from the left side of the terminal to the right side of the terminal. The vertical axis Y 004 is a straight line that passes through a midpoint of the terminal and is perpendicular to the horizontal plane, and a direction indicated by the straight line is a direction from the bottom of the terminal to the top of the terminal.

Further, the angle variation is an angle that the human face posture direction deviates from the reference direction reset by the terminal in the clockwise direction. The following provides detailed description with reference to FIG. 4.

Figure 4:
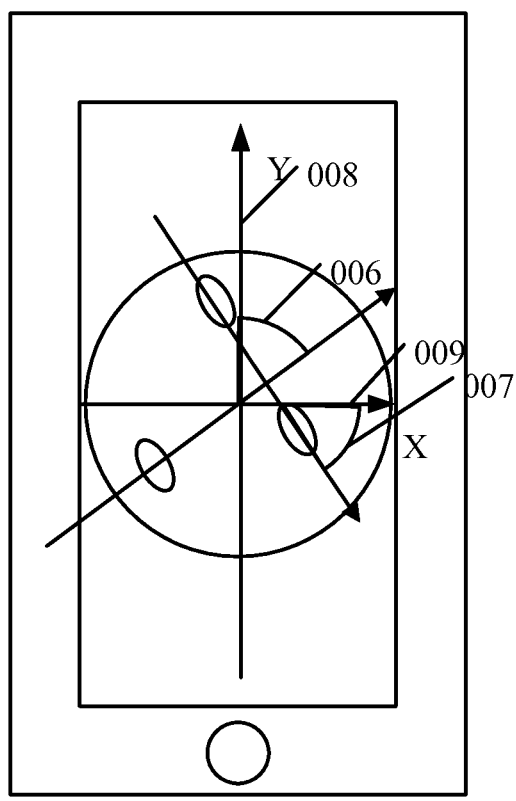
FIG. 4 is a schematic diagram of an angle variation that a human face posture direction deviates from a reference direction according to an embodiment of the present invention.

As shown in FIG. 4, an angle variation 006 is an angle variation that a vertical direction in the "+" vector of the human face posture direction deviates clockwise from a vertical reference direction vertical axis Y 008 in the plane coordinate system stipulated by the terminal. An angle variation 007 is an angle variation that a horizontal direction in the "+" vector of the human face posture direction deviates clockwise from a horizontal reference direction horizontal axis X 009 in the plane coordinate system stipulated by the terminal. Change value of the angle variation 006 equates the change value of the angle variation 007. Further, the angle variation that the vertical direction in the "+" vector of the human face posture direction deviates clockwise from the vertical reference direction in the plane coordinate system stipulated by the terminal is equal to the angle variation that the horizontal direction in the "+" vector of the human face posture direction deviates clockwise from the horizontal reference direction in the plane coordinate system stipulated by the terminal.

S102: rotating a display interface according to the human face posture information to adjust a direction of the display interface of the terminal.

In a specific embodiment, the direction of the display interface of the terminal is adjusted according to the angle variation in the human face posture information, so that an adjusted direction of the display interface accords with an orthophoric angle of the user. When the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 0° and smaller than 45°, the display interface is rotated until the vertical direction of the display interface is in the same direction as the vertical reference direction and the horizontal direction of the display interface is in the same direction as the horizontal reference direction. When the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 45° and smaller than 135°, the display interface is rotated until the vertical direction of the display interface deviates clockwise relative to the vertical reference direction by 90° and the horizontal direction of the display interface deviates clockwise relative to the horizontal reference direction by 90°. When the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 135° and smaller than 225°, the display interface is rotated until the vertical direction of the display interface deviates clockwise relative to the vertical reference direction by 180° and the horizontal direction of the display interface deviates clockwise relative to the horizontal reference direction by 180°. When the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 225° and smaller than 315°, the display interface is rotated until the vertical direction of the display interface deviates clockwise relative to the vertical reference direction by 270° and the horizontal direction of the display interface deviates clockwise relative to the horizontal reference direction by 270°. When the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 315° and smaller than 360°, the display interface is rotated until the vertical direction of the display interface is in the same direction as the vertical reference direction and the horizontal direction of the display interface is in the same direction as the horizontal reference direction.

Further, details may be described with reference to FIG. 4.

As shown in FIG. 4, it is assumed that an angle of the angle variation 006 that the vertical direction in the "+" vector of the human face posture direction deviates clockwise from the vertical reference direction vertical axis Y 008 in the plane coordinate system stipulated by the terminal or the angle variation 007 that the horizontal direction in the "+" vector of the human face posture direction deviates clockwise from the horizontal reference direction horizontal axis X 009 in the plane coordinate system stipulated by the terminal is 60°. The rotation rule may be followed: when the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 45° and smaller than 135°, the display interface is rotated until the vertical direction of the display interface deviates clockwise relative to the vertical reference direction by 90° and the horizontal direction of the display interface deviates clockwise relative to the horizontal reference direction by 90°. Therefore, the display interface is rotated until the vertical direction of the display interface deviates clockwise relative to the vertical reference direction by 90° and the horizontal direction of the display interface deviates clockwise relative to the horizontal reference direction by 90°, so that the display interface always remains in an orthophoric direction of the user. Understandably, when the display interface has been in the mentioned direction above before rotation, rotation is not performed.

A processing background of the terminal sends a screen rotation instruction to the display screen, and the display screen receives the screen rotation instruction and rotates the display interface. A rotation manner includes clockwise rotation and counterclockwise rotation. A terminal system analyzes and calculates the direction of the display interface which have been adjusted and the direction of a current display interface, to acquire a minimum rotation angle, and performs display interface rotation according to the minimum rotation angle.

In the embodiment of the present invention, a method for collecting human face image data of a user to acquire human posture information, and rotating a display interface according to the human face posture information, to adjust the direction of the display interface of a terminal can keep the display interface of the terminal in an orthophoric direction of a user, which improves visual experience of the user and makes a terminal more intelligent.

Figure 5:
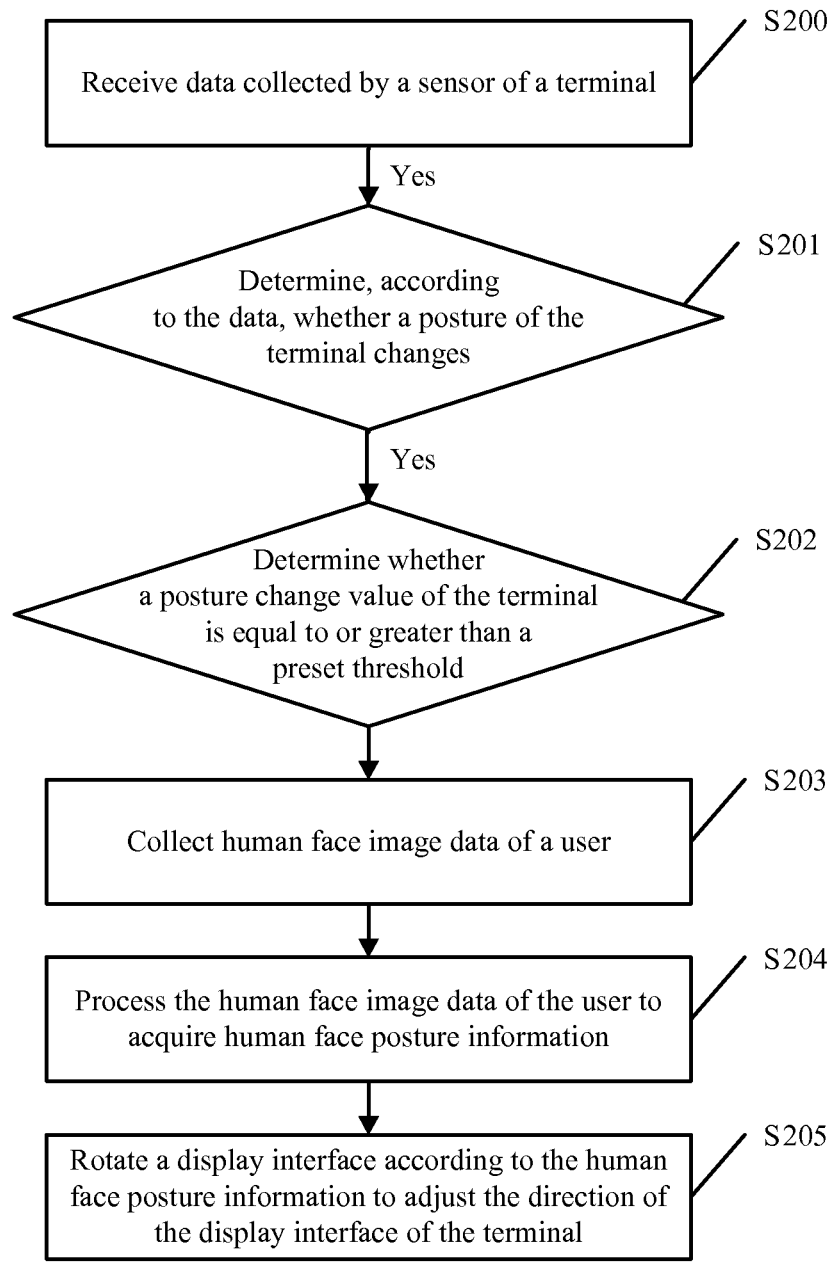
FIG. 5 is a schematic flowchart of a method for controlling display interface rotation of a terminal according to a second embodiment of the present invention.

Referring to FIG. 5, FIG. 5 is a flowchart of a method for controlling display interface rotation of a terminal according to a second embodiment of the present invention. As described in FIG. 5, the method for controlling display interface rotation of a terminal described in this embodiment includes the following steps.

S200: receiving data collected by a sensor of the terminal.

In a specific embodiment, the sensor may include a Gravity-sensor (G-sensor), a gyroscope, a geomagnetic sensor which are built in or externally arranged on the terminal. The gravity sensor may monitor and collect, in real time, gravity information of the terminal. The gravity information includes an accelerating force. The accelerating force is a force exerting on an object in a process of acceleration of the object, for example, all types of forces making an object move, such as a force making an object shake, drop, rise and fall. The gravity information may further include acceleration. The gyroscope is an angular motion detecting device that uses a moment of momentum sensitive shell of a high-speed rotating body to circle, relative to inertial space, one or two axes orthogonal to a spin axis of rotation. The gyroscope may displace toward the spatial directions X, Y, and Z under the Coriolis force generated when the terminal is rotated; and collect displacement data of the terminal, figure out a movement direction of the terminal according to the replacement data, and further acquire a posture direction of the terminal. The geomagnetic sensor collects a variation of magnetic field intensity of the earth magnetic field when a ferromagnetic object passes through the earth magnetic field, detects a change of a posture of the terminal according to the variation of magnetic field intensity, and may determine the posture direction of the terminal when the posture of the terminal changes greatly.

S201: determining, according to the data, whether a posture of the terminal changes; and when the posture of the terminal changes, step S202 is executed.

In a specific embodiment, the sensor sends the data to a microprocessor of the terminal for analysis and calculation so as to acquire a placing posture of the terminal relative to a horizontal plane; and acquires, according to the data, the placing posture the terminal, where the data collected by the sensor may include the gravity information collected by the gravity sensor, the replacement data collected by the gyroscope, or the variation of magnetic field intensity collected by the geomagnetic sensor. For example, when a user changes the terminal that is held by a hand of the user from a horizontal position to a vertical position, then the placing posture of the terminal is changed from a horizontal posture into a vertical posture according to the gravity information collected by the gravity sensor.

S202: determining whether a posture change value of the terminal is equal to or greater than a preset threshold; and when the posture change value of the terminal is equal to or greater than the preset threshold, step S203 is executed.

In a specific embodiment, the threshold may be an optimal threshold that can be reset by technical personnel and stored in a terminal system. The posture change value may include a gravity center change value of the posture, a direction change value of the posture, an azimuth change value of the posture, or the like. When the posture change value is smaller than the preset threshold, it indicates that the placing posture of the terminal only slightly deviates from an original position of the terminal, without affecting an orthophoric angle of the user. For example, a terminal in a portrait mode moves clockwise by an angle of 5°, that is, the placing posture of the terminal only slightly deviates from the original position, which will not affect the user to use and watch the display interface even if the direction of the display interface is not adjusted.

S203: collecting human face image data of a user.

S204: processing the human face image data of the user to acquire human face posture information.

S205: rotating a display interface according to the human face posture information to adjust the direction of the display interface of the terminal.

For steps S203, S204, and S205, descriptions can respectively refer to steps S100, S101, and S102 in the embodiment as shown in FIG. 1, and specific details are not repeatedly described herein.

In the embodiment of the present invention, a method for acquiring human face posture information by means of collecting human face image data of a user, and rotating a display interface according to the human face posture information to adjust the direction of the display interface of a terminal can keep the display interface of the terminal in an orthophoric direction of the user, which can improve visual experience of the user and make the terminal more intelligent.

Figure 6:
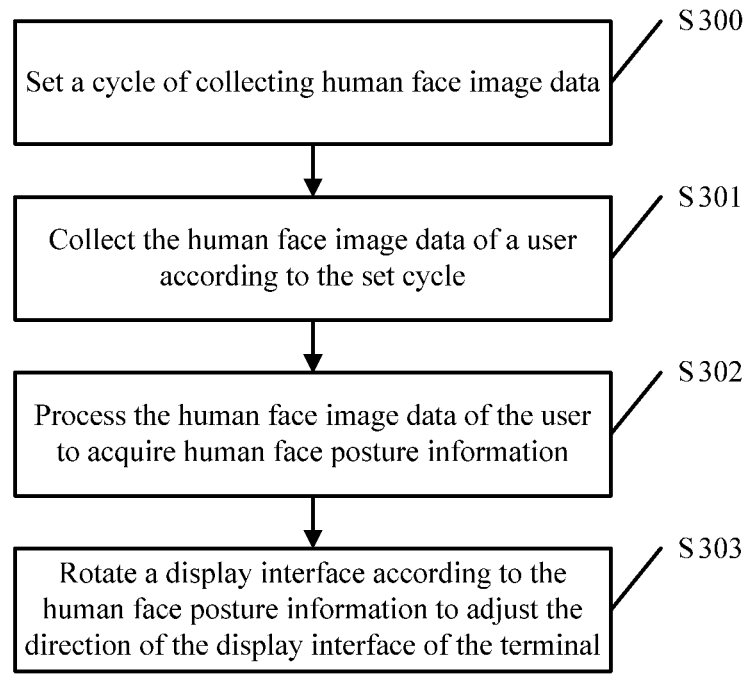
FIG. 6 is a schematic flowchart of a method for controlling display interface rotation of a terminal according to a third embodiment of the present invention.

Referring to FIG. 6, FIG. 6 is a flowchart of a method for controlling display interface rotation of a terminal according to a third embodiment of the present invention. As described in FIG. 6, the method for controlling display interface rotation of a terminal described in this embodiment includes the following steps:

S300: setting a cycle of collecting human face image data.

In a specific embodiment, the cycle of collecting human face image data may be set on a built-in timer of a terminal.

S301: collecting the human face image data of a user according to the cycle of collecting human face image data.

In a specific embodiment, when timing of the timer accords with the cycle of collecting human face image data, an image collector is started to collect the human face image data of the user. The image collector may be a front-facing camera of the terminal. The human face image data may include: human face features of the user, such as five sense organs, a skin color, and hair. Collecting human face image data of the user according to the cycle of collecting human face image data can figure out the problem that cannot be solved by collecting human face image data of the user according to data collected by a sensor, for example, when a placing posture of the terminal does not change but the user changes an orthophoric angle, the sight line of the user may change, therefore, the user cannot look straight into a display screen of the terminal. Due to the cycle of collecting human face image data, a change of a human face position may be observed, so that the direction of the display interface is further adjusted.

S302: processing the human face image data of the user to acquire human face posture information.

S303: rotating a display interface according to the human face posture information to adjust the direction of the display interface of the terminal.

For steps S302 and S303, descriptions can respectively refer to steps S101 and S102 in the embodiment as shown in FIG. 1, and specific details are not repeatedly described herein.

In the embodiment of the present invention, a method for acquiring human face posture information by means of collecting human face image data of a user, and rotating a display interface according to the human face posture information to adjust the direction of the display interface of a terminal can keep the display interface of the terminal in an orthophoric direction of the user, which can improve visual experience of the user and make the terminal more intelligent.

The following describes specific implementation of a terminal provided by an embodiment of the present invention.

Figure 7:
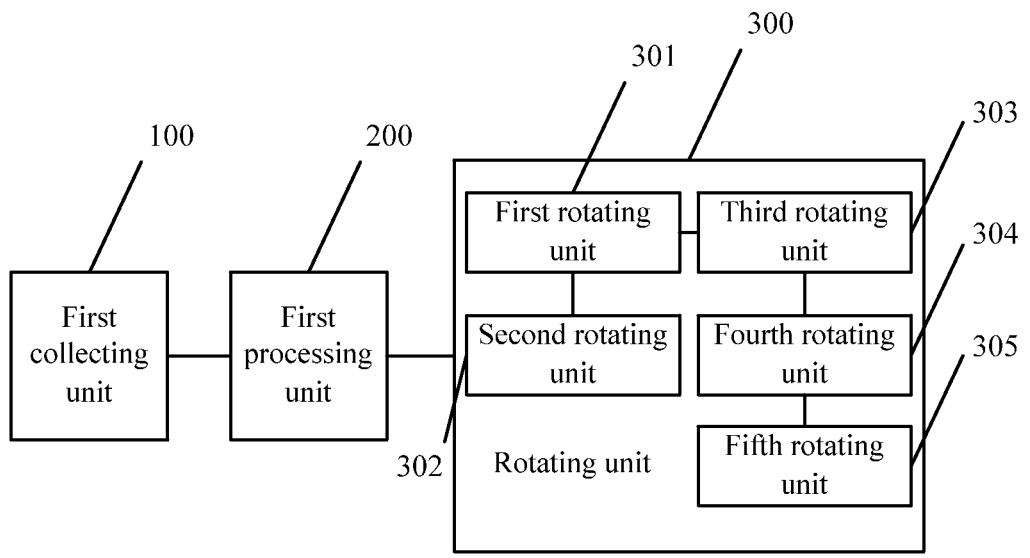
FIG. 7 is a schematic structural diagram of a terminal according to a first embodiment of the present invention.

Referring to FIG. 7, FIG. 7 is a schematic structural diagram of a terminal according to a first embodiment of the present invention. As shown in FIG. 7, the terminal described in this embodiment includes a first collecting unit 100, a first processing unit 200, and a rotating unit 300.

The first collecting unit 100 is configured to collect human face image data of a user.

In a specific embodiment, the first collecting unit 100 may be a front-facing camera of the terminal, where the front-facing camera obtains the human face image data of the user by photographing. The human face image data may include, but not limited to human face features of the user, such as five sense organs, a skin color, and hair.

The first processing unit 200 is configured to process the human face image data of the user to acquire human face posture information.

In a specific embodiment, the first processing unit 200 uses a pattern recognition technology to analyze the human face image data of the user to acquire the human face posture information of the user. The pattern recognition is a technology that classifies and describes images or varieties of physical objects. The pattern recognition technology is widely applied to machine vision, involving not only recognitions of a graph, an image, and a character, but also measurement, classification, and description of a tangible object.

Further, the human face posture information includes an angle variation that a human face posture direction deviates from a reference direction reset by the terminal in a clockwise direction. The human face posture direction is a "+" vector of a current human face. The following provides detailed description with reference to FIG. 2.

As described in FIG. 2, a direction indicated by a straight line between two eyes is defined as a horizontal direction 002 of the "+" vector of the human face posture direction, and a direction from the left eye to the right eye is defined as a positive direction of a horizontal axis according to the human face image data. A direction indicated by a straight line between a nose and a mouth is defined as a vertical direction 001 of the "+" vector of the human face posture direction, and a direction from the mouth to the nose is defined as a positive direction of a vertical axis according to the human face image data.

Further, the reference direction is a direction specified by the terminal in a stipulated plane coordinate system. The following provides detailed description with reference to FIG. 3.

As shown in FIG. 3, the plane coordinate system stipulated by the terminal can be a plane coordinate system formed by a horizontal axis X 003 and a vertical axis Y 004 as shown in FIG. 3. The horizontal axis X 003 is a horizontal reference direction which is specified by the terminal, and the vertical axis Y 004 is a vertical reference direction specified by the terminal. The reference direction remains unchanged relative to a direction of a display screen of the terminal, that is, the reference direction relative to the direction of the display screen of the terminal is shown by 005. When the terminal is in a portrait mode, the horizontal axis X 003 is a straight line that passes through a midpoint of the terminal and is parallel to the horizontal plane, and a direction indicated by the straight line is a direction from the left side of the terminal to the right side of the terminal. The vertical axis Y 004 is a straight line that passes through a midpoint of the terminal and is perpendicular to the horizontal plane, and a direction indicated by the straight line is a direction from the bottom of the terminal to the top of the terminal.

Further, the angle variation is an angle that the human face posture direction deviates from the reference direction reset by the terminal in the clockwise direction. The following provides detailed description with reference to FIG. 4.

As shown in FIG. 4, an angle variation 006 is an angle variation that a vertical direction in the "+" vector of the human face posture direction deviates clockwise from a vertical reference direction vertical axis Y 008 in the plane coordinate system stipulated by the terminal. An angle variation 007 is an angle variation that a horizontal direction in the "+" vector of the human face posture direction deviates clockwise from a horizontal reference direction horizontal axis X 009 in the plane coordinate system stipulated by the terminal. Change values of the angle variation 006 equate the change value of the angle variation 007. Further, the angle variation that the vertical direction in the "+" vector of the human face posture direction deviates clockwise from the vertical reference direction in the plane coordinate system stipulated by the terminal is equal to the angle variation that the horizontal direction in the "+" vector of the human face posture direction deviates clockwise from the horizontal reference direction in the plane coordinate system stipulated by the terminal.

The rotating unit 300 is configured to rotate a display interface according to the human face posture information to adjust a direction of the display interface of the terminal.

In a specific embodiment, the rotating unit 300 adjusts the direction of the display interface of the terminal according to the angle variation in the human face posture information, so that an adjusted direction of the display interface accords with an orthophoric angle of the user. When the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 0° and smaller than 45°, the display interface is rotated until the vertical direction of the display interface is in the same direction as the vertical reference direction and the horizontal direction of the display interface is in the same direction as the horizontal reference direction. When the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 45° and smaller than 135°, the display interface is rotated until the vertical direction of the display interface deviates clockwise relative to the vertical reference direction by 90° and the horizontal direction of the display interface deviates clockwise relative to the horizontal reference direction by 90°. When the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 135° and smaller than 225°, the display interface is rotated until the vertical direction of the display interface deviates clockwise relative to the vertical reference direction by 180° and the horizontal direction of the display interface deviates clockwise relative to the horizontal reference direction by 180°. When the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 225° and smaller than 315°, the display interface is rotated until the vertical direction of the display interface deviates clockwise relative to the vertical reference direction by 270° and the horizontal direction of the display interface deviates clockwise relative to the horizontal reference direction by 270°. When the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 315° and smaller than 360°, the display interface is rotated until the vertical direction of the display interface is in the same direction as the vertical reference direction and the horizontal direction of the display interface is in the same direction as the horizontal reference direction.

As shown in FIG. 4, it is assumed that an angle of the angle variation 006 that the vertical direction in the "+" vector of the human face posture direction deviates clockwise from the vertical reference direction vertical axis Y 008 in the plane coordinate system stipulated by the terminal or the angle variation 007 that the horizontal direction in the "+" vector of the human face posture direction deviates clockwise from the horizontal reference direction horizontal axis X 009 in the plane coordinate system stipulated by the terminal is 60°. The rotation rule may be followed: when the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 45° and smaller than 135°, the display interface is rotated until the vertical direction of the display interface deviates clockwise relative to the vertical reference direction by 90° and the horizontal direction of the display interface deviates clockwise relative to the horizontal reference direction by 90°. Therefore, the display interface is rotated until the vertical direction of the display interface deviates clockwise relative to the vertical reference direction by 90° and the horizontal direction of the display interface deviates clockwise relative to the horizontal reference direction by 90°, so that the display interface always remains in an orthophoric direction of the user. Understandably, when the display interface has been in the mentioned direction above before rotation, rotation is not performed.

A processing background of the terminal sends a screen rotation instruction to the display screen, and the display screen receives the screen rotation instruction and rotates the display interface. A rotation manner includes clockwise rotation and counterclockwise rotation. A terminal system analyzes and calculates the direction of the display interface which have been adjusted and the direction of a current display interface to acquire a minimum rotation angle, and performs display interface rotation according to the minimum rotation angle.

The rotating unit 300 may further include: a first rotating unit 301, a second rotating unit 302, a third rotating unit 303, a fourth rotating unit 304, and a fifth rotating unit 305.

The first rotating unit 301 is configured to, when the angle variation is equal to or greater than 0° and smaller than 45°, rotate the display interface until the direction of the display interface is in the same direction as the reference direction.

In a specific embodiment, the first rotating unit 301 is configured to, when the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 0° and smaller than 45°, rotate the display interface until the vertical direction of the display interface is in the same direction as the vertical reference direction and the horizontal direction of the display interface is in the same direction as the horizontal reference direction.

The second rotating unit 302 is configured to, when the angle variation is equal to or greater than 45° and smaller than 135°, rotate the display interface until the direction of the display interface deviates clockwise relative to the reference direction by 90°.

In a specific embodiment, the second rotating unit 302 is configured to, when the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 45° and smaller than 135°, rotate the display interface until the vertical direction of the display interface deviates clockwise relative to the vertical reference direction by 90° and the horizontal direction of the display interface deviates clockwise relative to the horizontal reference direction by 90°.

The third rotating unit 303 is configured to, when the angle variation is equal to or greater than 135° and smaller than 225°, rotate the display interface until the direction of the display interface deviates clockwise relative to the reference direction by 180°.

In a specific embodiment, the third rotating unit 303 is configured to, when the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 135° and smaller than 225°, rotate the display interface until the vertical direction of the display interface deviates clockwise relative to the vertical reference direction by 180° and the horizontal direction of the display interface deviates clockwise relative to the horizontal reference direction by 180°.

The fourth rotating unit 304 is configured to, when the angle variation is equal to or greater than 225° and smaller than 315°, rotate the display interface until the direction of the display interface deviates clockwise relative to the reference direction by 270°.

In a specific embodiment, the fourth rotating unit 304 is configured to, when the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 225° and smaller than 315°, rotate the display interface until the vertical direction of the display interface deviates clockwise relative to the vertical reference direction by 270° and the horizontal direction of the display interface deviates clockwise relative to the horizontal reference direction by 270°.

The fifth rotating unit 305 is configured to, when the angle variation is equal to or greater than 315° and smaller than 360°, rotate the display interface until the direction of the display interface is in the same direction as the reference direction.

In a specific embodiment, the fifth rotating unit 305 is configured to, when the angle variation that the vertical direction in the "+" vector of the human face posture direction deviates clockwise from the vertical reference direction in the plane coordinate system stipulated by the terminal or the angle variation that the horizontal direction in the "+" vector of the human face posture direction deviates clockwise from the horizontal reference direction in the plane coordinate system stipulated by the terminal is equal to or greater than 315° and smaller than 360°, rotate the display interface until the vertical direction of the display interface is in the same direction as the vertical reference direction and the horizontal direction of the display interface is in the same direction as the horizontal reference direction.

In the embodiment of the present invention, the terminal can acquire human posture information by means of collecting human face image data of a user, and rotate a display interface according to the human face posture information to adjust a display interface direction of a terminal, which can keep the display interface of the terminal in an orthophoric direction of a user, which improves visual experience of the user and make a terminal more intelligent.

Figure 8:
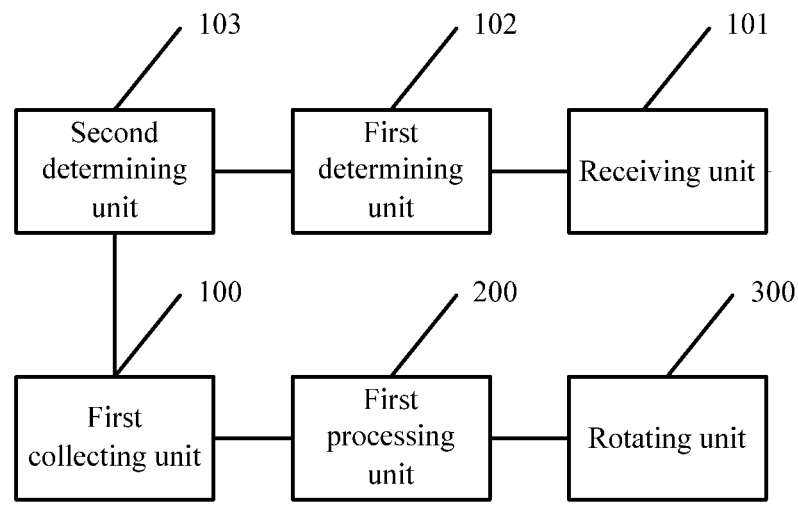
FIG. 8 is a schematic structural diagram of a terminal according to a second embodiment of the present invention.

Referring to FIG. 8, FIG. 8 is a schematic structural diagram of a terminal according to a second embodiment of the present invention. The terminal described in this embodiment includes:

a first collecting unit 100, a first processing unit 200, and a rotating unit 300.

The terminal further includes: a receiving unit 101, a first determining unit 102, and a second determining unit 103.

The receiving unit 101 is configured to receive data collected by a sensor of the terminal.

In a specific embodiment, the receiving unit 101 receives the data collected by the sensor. The sensor may include: a Gravity-sensor (G-sensor), a gyroscope, a geomagnetic sensor which are built in or externally arranged on the terminal. The gravity sensor may monitor and collect, in real time, gravity information of the terminal. The gravity information includes: an accelerating force. The accelerating force is a force exerting on an object in a process of acceleration of the object, for example, all types of forces making an object move, such as a force making an object shake, drop, rise and fall. The gravity information may further include acceleration. The gyroscope is an angular motion detecting device that uses a moment of momentum sensitive shell of a high-speed rotating body to circle, relative to inertial space, one or two axes orthogonal to a spin axis of rotation. The gyroscope may displace toward the spatial directions X, Y, and Z under the Coriolis force generated when the terminal is rotated, and collect displacement data of the terminal, figure out a movement direction of the terminal according to the replacement data, and further acquire a posture direction of the terminal. The geomagnetic sensor collects a variation of magnetic field intensity of the earth magnetic field when a ferromagnetic object passes through the earth magnetic field, detects a change of a posture of the terminal according to the variation of magnetic field intensity, and may determine the posture direction of the terminal when the posture of the terminal changes greatly.

The first determining unit 102 is configured to determine, according to the data, whether the posture of the terminal changes or not.

In a specific embodiment, the sensor sends the data collected by the sensor to a microprocessor of the terminal for analysis and calculation to acquire a placing posture the terminal relative to a horizontal plane; and acquires, according to the data, the placing posture the terminal, where the data collected by the sensor may include the gravity information collected by the gravity sensor, the replacement data collected by the gyroscope, or the variation of magnetic field intensity collected by the geomagnetic sensor. For example, when a user changes the terminal that is held by a hand of the user from a horizontal position to a vertical position, then the placing posture of the terminal is changed from a horizontal posture into a vertical posture according to the gravity information collected by the gravity sensor.

When it is determined, according to the data, that the posture of the terminal changes, the first determining unit 102 instructs the second determining unit 103 to determine whether a posture change value of the terminal is equal to or greater than a preset threshold.

The second determining unit 103 is configured to, when the posture of the terminal changes, determine whether the posture change value of the terminal is equal to or greater than the preset threshold.

In a specific embodiment, the threshold may be an optimal threshold that can be reset by technical personnel and stored in a terminal system. The posture change value may include a gravity center change value of the posture, a direction change value of the posture, an azimuth change value of the posture, or the like. When the posture change value is smaller than the preset threshold, it indicates that the placing posture of the terminal only slightly deviates from an original position of the terminal, without affecting an orthophoric angle of the user. For example, a terminal in a portrait mode moves clockwise by an angle of 5°, that is, the placing posture of the terminal only slightly deviates from the original position, which will not affect the user to use and watch the display interface even if the direction of the display interface is not changed.

When the posture change value of the terminal is equal to or greater than the preset threshold, the second determining unit 103 instructs the first collecting unit 100 to collect the human face image data of the user.

In the embodiment of the present invention, the terminal can collect human face image data of a user, acquire human posture information, and rotate a display interface according to the human face posture information so as to adjust the direction of the display interface of the terminal, which can keep the display interface of the terminal in an orthophoric direction of the user, thereby improving visual experience of the user and making the terminal more intelligent.

Figure 9:
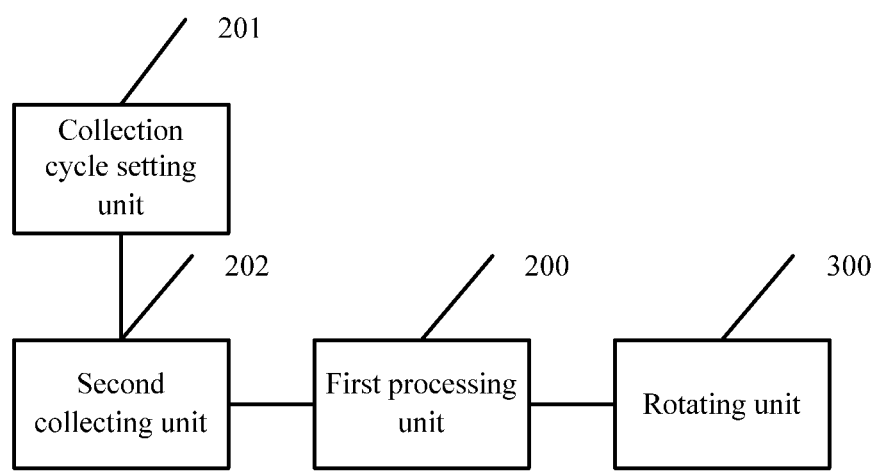
FIG. 9 is a schematic structural diagram of a terminal according to a third embodiment of the present invention.

Referring to FIG. 9, FIG. 9 is a schematic structural diagram of a terminal according to a third embodiment of the present invention. The terminal described in this embodiment includes:

a first collecting unit 100, a first processing unit 200, and a rotating unit 300.

The terminal described in this embodiment further includes: a collection cycle setting unit 201 and a second collecting unit 202.

The collection cycle setting unit 201 is configured to set a cycle of collecting human face image data.

In a specific embodiment, the cycle of collecting human face image data may be set on a built-in timer of the terminal.

The second collecting unit 202 is configured to collect human face image data of a user according to the cycle of collecting human face image data.

In a specific embodiment, when timing of the timer accords with the cycle of collecting human face image data, which is set by the collection cycle setting unit 201, the second collecting unit 202 starts an image collector to collect the human face image data of the user. The image collector may be a front-facing camera of the terminal. The human face image data may include: human face features of the user, such as five sense organs, a skin color, and hair. Collecting human face image data of the user according to the cycle of collecting human face image data can solve the problem that cannot be solved by collecting human face image data of the user according to data collected by a sensor, for example, when a placing posture of the terminal does not change but the user changes an orthophoric angle, the sight line of the user may change, therefore, the user cannot look straight into a display screen of the terminal. Due to the cycle of collecting human face image data, a change of a human face position may be observed, so that the direction of the display interface is further adjusted.

In the embodiment of the present invention, a method and a terminal for collecting human face image data of a user, acquiring human posture information, and rotating a display interface according to the human face posture information to adjust the direction of the display interface of the terminal can always keep a display interface of the terminal in an orthophoric direction of the user, which improves visual experience of the user and makes the terminal more intelligent.

The modules or units in the embodiments of the present invention may be implemented by using a general integrated circuit, for example, a CPU (Central Processing Unit), or by using an ASIC (Application Specific Integrated Circuit).

According to an actual requirement, the steps in the methods of the embodiments of the present invention may be combined and pruned, and their sequence may be adjusted.

The modules or units in the apparatus of the embodiments of the present invention may be combined, divided, and pruned according to an actual requirement. In the embodiments of the present invention, a method for collecting human face image data of a user, acquiring a human face position, and adjusting the direction of the display interface of a terminal according to the human face position can keep a display interface of the terminal in an orthophoric direction of the user, which improves visual experience of the user and makes the terminal more intelligent.

A person of ordinary skill in the art may understand that all or a part of the processes of the methods in the foregoing embodiments may be implemented by a computer program instructing relevant hardware. The program may be stored in a computer readable storage medium. When the program runs, the processes of the foregoing method embodiments may be included. The storage medium may be a magnetic disk, an optical disc, a read-only memory (ROM), a random access memory (RAM), or the like.

The foregoing embodiments are merely exemplary embodiments of the present invention and are not intended to limit the scope of the claims of the present invention. Any equivalent variance made according to the claims of the present invention shall fall within the scope of the present invention.

What is claimed is:

1. A method for controlling display interface rotation of a terminal, comprising:
   receiving data collected by a sensor of the terminal;
   determining according to the data, whether a posture of the terminal changes;
   if the posture of the terminal changes, determining whether a posture change value of the terminal is equal to or greater than a preset threshold; and
   if the posture change value of the terminal is equal to or greater than the preset threshold, collecting human face image data of a user;
   processing the human face image data of the user to acquire human face posture information; and
   rotating a display interface according to the human face posture information to adjust a direction of the display interface of a terminal.

2. The method according to claim 1, further comprising:
   setting a cycle of collecting human face image data, wherein,
   the collecting human face image data of a user, comprises:
   collecting the human face image data of the user according to the set cycle of collecting human face image data.

3. The method according to claim 1, wherein the human face posture information, comprises:
   an angle variation that a human face posture direction deviates from a reference direction reset by the terminal in a clockwise direction, wherein,
   the reference direction is a direction specified by the terminal in a stipulated plane coordinate system.

4. The method according to claim 3, wherein the rotating a display interface according to the human face posture information to adjust a direction of the display interface of a terminal, comprises:
   when the angle variation is equal to or greater than 0° and smaller than 45°, rotating the display interface until the direction of the display interface is in the same direction as the reference direction;
   when the angle variation is equal to or greater than 45° and smaller than 135°, rotating the display interface until the direction of the display interface deviates clockwise relative to the reference direction by 90°;
   when the angle variation is equal to or greater than 135° and smaller than 225°, rotating the display interface until the direction of the display interface deviates clockwise relative to the reference direction by 180°;
   when the angle variation is equal to or greater than 225° and smaller than 315°, rotating the display interface until the direction of the display interface deviates clockwise relative to the reference direction by 270°; and
   when the angle variation is equal to or greater than 315° and smaller than 360°, rotating the display interface until the direction of the display interface is in the same direction as the reference direction.

5. A terminal, comprising:
   a receiving unit, configured to receive data collected by a sensor of the terminal;
   a first determining unit, configured to determine, according to the data, whether a posture of the terminal changes; and
   a second determining unit, configured to, when the posture of the terminal changes, determine whether a posture change value of the terminal is equal to or greater than a preset threshold, and when the posture change value of the terminal is equal to or greater than the preset threshold, instructing the first collecting unit to collect the human face image data of the user;
   a first collecting unit, configured to collect human face image data of a user;
   a first processing unit, configured to process the human face image data of the user to acquire human face posture information; and
   a rotating unit, configured to rotate a display interface according to the human face posture information to adjust a direction of the display interface of the terminal.

6. The terminal according to claim 5, further comprising:
   a collection cycle setting unit, configured to set a cycle of collecting human face image data; and
   a second collecting unit, configured to collect the human face image data of the user according to the set cycle of collecting human face image data.

7. The terminal according to claim 5, wherein the human face posture information comprises:
   an angle variation that a human face posture direction deviates from a reference direction reset by the terminal in a clockwise direction, wherein,
   the reference direction is a direction specified by the terminal in a stipulated plane coordinate system.

8. The terminal according to claim 7, wherein the rotating unit comprises:
   a first rotating unit, configured to, when the angle variation is equal to or greater than 0° and smaller than 45°, rotate the display interface until the direction of the display interface is in the same direction as the reference direction;
   a second rotating unit, configured to, when the angle variation is equal to or greater than 45° and smaller than 135°, rotate the display interface until the direction of the display interface deviates clockwise relative to the reference direction by 90°;
   a third rotating unit, configured to, when the angle variation is equal to or greater than 135° and smaller than 225°, rotate the display interface until the direction of the display interface deviates clockwise relative to the reference direction by 180°;
   a fourth rotating unit, configured to, when the angle variation is equal to or greater than 225° and smaller than 315°, rotate the display interface until the direction of the display interface deviates clockwise relative to the reference direction by 270°; and
   a fifth rotating unit, configured to, when the angle variation is equal to or greater than 315° and smaller than 360°, rotate the display interface until the direction of the display interface is in the same direction as the reference direction.

\* \* \* \* \*